United States Patent

Berger et al.

[11] Patent Number: 6,105,874
[45] Date of Patent: Aug. 22, 2000

[54] DUAL-MODE DATA CARRIER AND CIRCUIT FOR SUCH A DATA CARRIER WITH SIMPLIFIED DATA TRANSFER MEANS

[75] Inventors: Dominik J. Berger; Bernhard Czar, both of Graz, Australia; Klaus Sickert, Bönningstedt, Germany

[73] Assignee: U.S. Philips Corporation, New York, N.Y.

[21] Appl. No.: 09/177,015

[22] Filed: Oct. 22, 1998

[30] Foreign Application Priority Data

Oct. 22, 1997 [EP] European Pat. Off. .............. 97890209

[51] Int. Cl.⁷ .................................................. G06K 65/00
[52] U.S. Cl. .................................. 235/492; 235/380
[58] Field of Search .................................. 235/380, 382, 235/382.5, 492

[56] References Cited

U.S. PATENT DOCUMENTS

5,206,495  4/1993  Kreft ........................................ 235/492
5,929,414  7/1999  Saitoh ...................................... 235/380

*Primary Examiner*—Donald Hajec
*Assistant Examiner*—Mark Tremblay

[57] ABSTRACT

A data carrier (1) which can be operated in a contact-bound mode and in a contactless mode and a circuit (2) for such a data carrier (1) has contact-bound interface means (3), contactless interface means (4), data processing means (22) and data transfer means (27) by which data received when the contact-bound mode is activated and when the contactless mode is activated can be transferred from the respective interface means (3, 4) to the data processing means (22), the data transfer means (27) being constructed to perform a logic OR function and, in conformity with this construction, when simultaneously data are received by the contact-bound interface means (3) and by the contactless interface means (4) to transfer said simultaneously received data to the data processing means (22).

12 Claims, 2 Drawing Sheets

DUAL-MODE DATA CARRIER AND CIRCUIT FOR SUCH A DATA CARRIER WITH SIMPLIFIED DATA TRANSFER MEANS

BACKGROUND OF THE INVENTION

The invention relates to a data carrier which can be operated in a contact-bound mode and in a contactless mode and which includes the means specified hereinafter, namely contact-bound interface means via which data can be received in the contact-bound mode and which include contact-bound data output means for supplying data received in the contact-bound mode, and contactless interface means via which data can be received in the contactless mode and which include contactless data output means for supplying data received in the contactless mode, and data processing means which include data input means for receiving data received in the contact-bound mode and received in the contactless mode and by which the data received in the contact-bound mode and received in the contactless mode can be processed, and data transfer means which include first data input means and second data input means as well as data output means, of which the first data input means are connected to the contact-bound data output means of the contact-bound interface means, and of which the second data input means are connected to the contactless data output means of the contactless interface means, and of which the data output means are connected to the data input means of the data processing means, and which are constructed to transfer data received in the contact-bound mode and applied to their first data input means, and to transfer data received in the contactless mode and applied to the data processing means via their data output means, and to inhibit a transfer of received data from one of their data input means to the other one of the data input means.

The invention further relates to a circuit for a data carrier, which circuit can be operated in a contact-bound mode and in a contactless mode and which includes the means specified hereinafter, namely contact-bound interface means via which data can be received in the contact-bound mode and which include contact-bound data output means for supplying data received in the contact-bound mode, and contactless interface means via which data can be received in the contactless mode and which include contactless data output means for supplying data received in the contactless mode, and data processing means which include data input means for receiving data received in the contact-bound mode and received in the contactless mode and by which the data received in the contact-bound mode and received in the contactless mode can be processed, and data transfer means which include first data input means and second data input means as well as data output means, of which the first data input means are connected to the contact-bound data output means of the contact-bound interface means, and of which the second data input means are connected to the contactless data output means of the contactless interface means, and of which the data output means are connected to the data input means of the data processing means, and which are constructed to transfer data received in the contact-bound mode and applied to their first data input means, and to transfer data received in the contactless mode and applied to the data processing means via their data output means, and to inhibit a transfer of received data from one of their data input means to the other one of the data input means.

Such a data carrier of the type defined in the first paragraph and such a circuit of the type defined in the second paragraph are known, for example from the document U.S. Pat. No. 5,206,495.

In the known data carrier and the known circuit the data transfer means have a construction by means of which a change-over between the contact-bound interface means and the contactless interface means is possible. Said document states that the data transfer means are constituted by a so-called multiplexer. As described in said document in column 3, lines 7 to 10 and in column 4, lines 3 to 5, such data transfer means enable either data supplied by the contact-bound interface means or data supplied by the contactless interface means to be transferred to the data processing means. Such known data transfer means, which preferably take the form of a multiplexer, are of a comparatively intricate circuit design, because such a multiplexer normally or usually comprises at least two AND gates, an inverter and an OR gate. Moreover, in the case of such data transfer means constructed as a change-over switch, it is necessary that these data transfer means have a control input arranged to receive a control signal or control information for controlling the change-over, separate control signal generating means or control information generating means being needed for the generation of this control signal or the control information. Thus, everything considered, the construction of a data carrier or a circuit for such a data carrier as known from the document U.S. Pat. No. 5,206,495 requires a comparatively high circuit complexity, which even in the case of implementation in integrated circuit technology is to be regarded as rather unfavorable.

SUMMARY OF THE INVENTION

It is an object of the invention to avoid the aforementioned facts and to provide an improved data carrier and an improved circuit for a data carrier in a simple manner, with the aid of minimal means and with a minimal expenditure.

According to the invention, in order to achieve the aforementioned object in a data carrier of the type defined in the first paragraph, the data transfer means are constructed to perform a logic OR function, and in conformity with this construction the data transfer means are adapted to simultaneously transfer data received simultaneously on their first data input means and on their second data input means to their data output means and thus to the data processing means. Such a construction of a data carrier has the great advantage that the data transfer means can be realized with a very simple and therefore low-cost circuit. Moreover, such a construction has the further great advantage that no separate control features for the data transfer means are required but can be dispensed with, which is also very advantageous in order to realize a circuit which is as simple as possible. With the construction in accordance with the invention the very rare practical situation may arise—when both the contact-bound mode and the contactless mode have been activated, which is very unlikely to occur in practice—that data received via the contact-bound interface means as well as via the contactless interface means appear, which form an unusable data mixture. However, in practice this does not present a real problem because in the case that such an unusable data mixture occurs the data processing means can detect the presence of such an unusable data mixture and can inhibit further processing of this data mixture.

In a data carrier in accordance with the invention having the characteristic features defined in the independent Claim 1 the data transfer means can essentially be formed by two diodes having, for example, their anodes connected to the data output means of the data transfer means and having their cathodes connected to one another and to the data input means of the data transfer means. However, in a data carrier in accordance with the invention having the characteristic features defined in the independent Claim 1 it has proved to be particularly advantageous if, in addition, the measures defined in the dependent Claim 2 are taken. Such an OR gate has the advantage that, as compared with diodes, no voltage loss occurs, as a result of which in the case of an OR gate always the full level is available on the data output means of the data transfer means.

In a data carrier in accordance with the invention having the characteristic features defined in the independent Claim 1 it has further proved to be advantageous if, in addition, the measures defined in the dependent Claim 3 are taken. This is very advantageous in view of a particularly simple circuit design. It is to be noted that the measures defined in the dependent Claim 3 can also be applied advantageously to a data carrier in accordance with the invention having the characteristic features defined in the dependent Claim 2.

For a data carrier in accordance with the invention having the characteristic features defined in the independent Claim 1 it has also proved to be advantageous if, in addition, the measures defined in the dependent Claim 4 are taken. This is advantageous in view of unambiguously defined switching states and, consequently, a trouble-free operation. It is to be noted that the measures defined in the dependent Claim 4 can also be applied advantageously to data carriers in accordance with the invention having the characteristic features defined in the dependent Claims 2 and 3.

In a data carrier in accordance with the invention having the characteristic features defined in the independent Claim 1 it has further proved to be advantageous if, in addition, the measures defined in the dependent Claim 5 are taken. This is advantageous in view of a reliable and faultless performance of a data carrier in accordance with the invention. It is to be noted that the measures defined in the dependent Claim 5 can also be applied advantageously to data carriers in accordance with the invention having the characteristic features defined in the dependent Claims 2, 3 and 4.

In a data carrier in accordance with the invention having the characteristic features defined in the independent Claim 1 it has proved to be particularly advantageous if, in addition, the measures defined in the dependent Claim 6 are taken. In practice, such an embodiment has proved to be particularly effective and advantageous because clock signals allow a very distinct and unambiguous detection whether the contact-bound mode or the contactless mode has been activated in a data carrier in accordance with the invention.

According to the invention, in order to achieve the afore-mentioned object, a circuit of the type defined in the second paragraph is characterized in that the data transfer means are constructed to perform a logic OR function, and in conformity with this construction the data transfer means are adapted to simultaneously transfer data received simultaneously on their first data input means and on their second data input means to their data output means and thus to the data processing means. In this way, advantages which correspond to the advantages described hereinbefore for a data carrier in accordance with the invention having the characteristic features defined in the independent Claim 1 are obtained for a circuit in accordance with the invention.

The advantageous variants of a circuit in accordance with the invention, which variants have the characteristic features defined in the dependent Claims 8 and 12, yield advantages which correspond to the advantages described above for the advantageous variants of a data carrier in accordance with the invention, which variants have the characteristic features defined in the dependent Claim defined in the dependent Claims 2 to The afore-mentioned aspects as well as further aspects of the invention will be apparent from the embodiments described hereinafter by way of examples and will be elucidated with reference to this embodiments.

BRIEF DESCRIPTION OF THE DRAWINGS

The invention will now be described in more detail with reference to two embodiments shown in the drawings and given by way of examples, but to which the invention is not limited.

DESCRIPTION OF THE PREFERRED EMBODIMENTS

Figure 1:
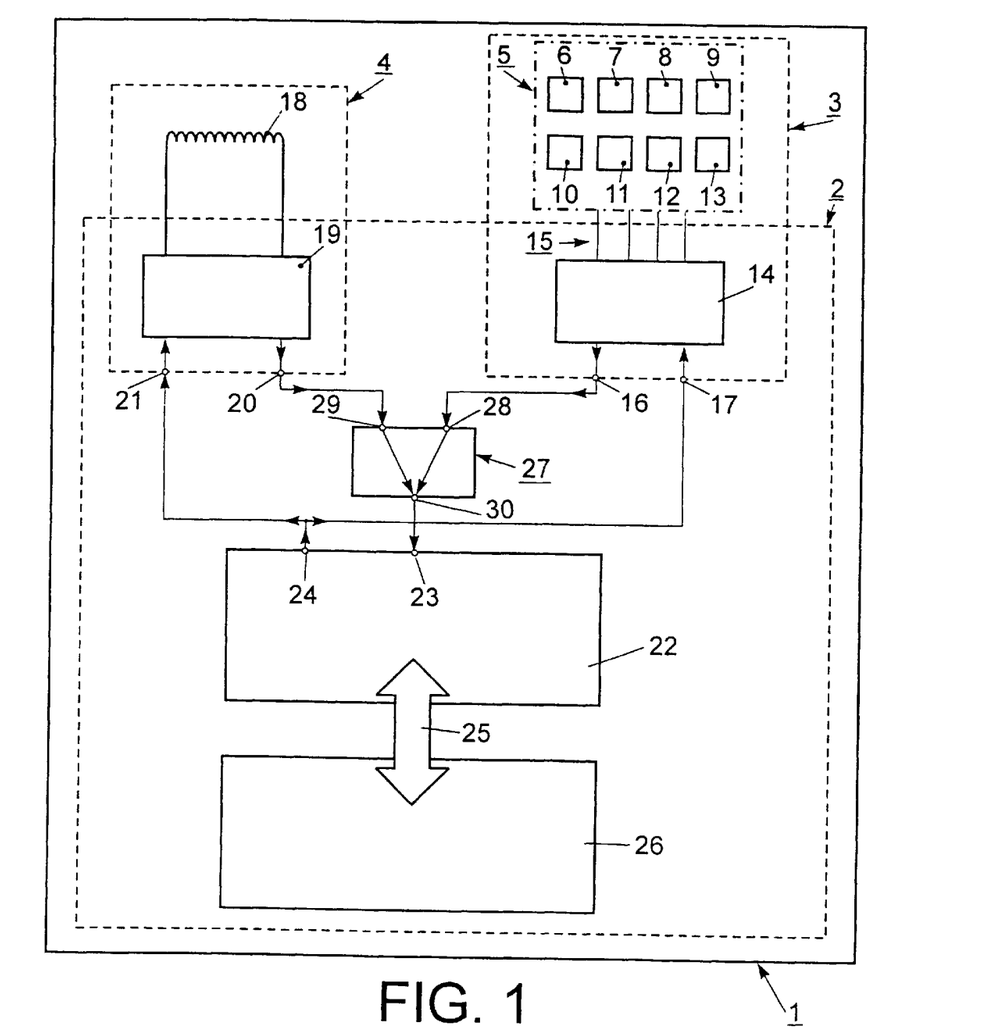
FIG. 1 a diagrammatic representation in the form of a block diagram which shows the relevant part of data carrier and a circuit for this data carrier in accordance with a first embodiment of the invention.

FIG. 1 is a diagrammatic representation in the form of a block diagram which shows a part of a data carrier 1 and a circuit 2 for the data carrier 1 in accordance with a first embodiment of the invention. In the present case the data carrier 1 is a so-called combi-card. The circuit 2 takes the form of an integrated circuit.

The data carrier 1 and its circuit 2 can be operated in a so-called contact-bound mode and in a so-called contactless mode. For this purpose, the data carrier 1 includes contact-bound interface means 3 and contactless interface means 4.

The contact-bound interface means 3 include a contact array 5 comprising eight contacts 6, 7, 8, 9, 10, 11, 12 and 13 in total, via which eight contacts the data carrier 1, when in its contact-bound mode, can cooperate in a contact-bound fashion with a correspondingly constructed write/read device which is suitable for this purpose. The contact-bound interface means 3 further include a contact-bound signal section 14 which—as is shown diagrammatically in FIG. 1—is connected to the contacts of the contact array 5 via lines 15. When the contact-bound mode is active it is possible to receive data via the contact-bound interface means 3, which data can be processed in the contact-bound signal section 14 and which can be transferred from the contact-bound signal section 14 to the contact-bound data output means 16 of the contact-bound interface means 3, which output means serve for outputting the data received when the contact-bound mode is active. In the present case the contact-bound data output means 16 are formed by a signal data output contact, via which it is possible to transfer the data supplied in serial form by the contact-bound signal section 14. However, alternatively, the contact-bound signal section 14 can be constructed so as to processes the data received from the contact array 5 in such a manner that this section supplies this data in parallel form, in which case the contact-bound data output means of the contact-bound interface means comprise a plurality of data output contacts.

The contact-bound interface means 3 further include contact-bound data input means 17 which serve to receive data supplied when the data carrier 1 is active in the contact-bound mode. In the present case, these contact-bound data input means 17 also comprise a single data input contact via which data can be transferred in serial form to the contact-bound signal section 14 of the contact-bound interface means 3.

The contactless interface means 4 include a transmission coil 18 via which data can be received in an inductive, i.e. contactless, manner from a correspondingly constructed write/read device which is suitable for this purpose and via which, in the opposite direction, data supplied by the data carrier 1 can be transferred to the transmitting/receiving device in an inductive, i.e. contactless manner. The contactless interface means 4 further include a contactless signal section 19 connected to the transmission coil 18. By means of the contactless signal section 19 data received by the transmission coil 18 can be regenerated and data to be transmitted by the transmission coil 18 can be prepared for transmission. In the contactless mode it is thus possible to receive data via the contactless interface means 4 and, after they have been processed and regenerated by means of the contactless signal section 19, to transfer them to contactless data output means 20 of the contactless interface means 4, which serve for the output of the data received when the contactless mode is active. In the present case, the contactless data output means 20 comprise only a signal data output contact. It is to be noted that, similarly to the contact-bound data output means 16, the contactless data output means may also comprise a plurality of data output contacts, if required.

The contactless interface means 4 further include contactless data input means 21 which serve for receiving data supplied when the contactless mode is active. In the present case, the contactless data input means 21 of the contactless interface means 4 also comprise only a single data input contact.

The data carrier 1 and its circuit 2 further include data processing means 22. The data processing means 22 serve for processing data received when the contact-bound mode is active and when the contactless mode is active and for processing data to be supplied, i.e. to be transmitted, when the contact-bound mode is active and when the contactless mode is active. The data processing means 22 include data input means 23 for receiving data received in the contact-bound mode and in the contactless mode. In the present case, the data input means 23 comprise only a single data input contact. The data processing means 22 further have data output means 24, which serve for the output of data supplied in the contact-bound mode and in the contactless mode. In the present case, the data output means 24 also comprise only a single data output contact.

The data processing means 22 are connected to memory means 26 via a bus 25. The memory means 26 are formed by a so-called EEPROM. However, alternatively the memory means 26 can be formed by a so-called RAM, but in that case the RAM should constantly receive a supply voltage. The memory means 26 can store data received by the data carrier 1 and processed by the data processing means 22. Furthermore, data stored in the memory means 26 can be read from the memory means 26 by the data processing means 22 via the bus 25 in order to be transferred to a read/write device via the contact-bound interface means 3 when the contact-bound mode is active and to a transmitting/receiving device via the contactless interface means 4 when the contactless mode is active.

The data carrier 1 and its circuit 2 further include data transfer means 27. The data transfer means 27 comprise first data input means 28, second data input means 29 and data output means 30. The first data input means 28 are connected to the contact-bound data output means 16 of the contact-bound interface means 3. The second data input means 29 are connected to the contactless data output means 20 of the contactless interface means 4. The data output means 30 are connected to the data input means 23 of the data processing means 22. The data transfer means 27 can transfer data received in the contact-bound mode and applied to the first data input means 28 and data received in the contactless mode and applied to the second data input means 29 to the data processing means 22 via the data output means 30. The construction of the data transfer means 27 ensures that in the data transfer means 27 a transfer of received data from the data input means 28 or to the other data input means 29 or 28 is inhibited.

In the data carrier 1 shown in FIG. 1 the data transfer means 27 are advantageously constructed in accordance with a logic OR function. This construction of the data transfer means 27 allows the data transfer means 27 to transfer data received at the same time by the first data input means 28 and the second data input means 29 of these data transfer means to be transferred at the same time to the data output means 30 and thus to the data processing means 22.

The construction of the data carrier 1 and its circuit 2 has the great advantage that the data transfer means 27 can be implemented as a very simple and, consequently, low-cost circuit. This construction further has the great advantage that no separate control provisions are required for the data transfer means 27, which is also very advantageous for a simple circuit design.

Figure 2:
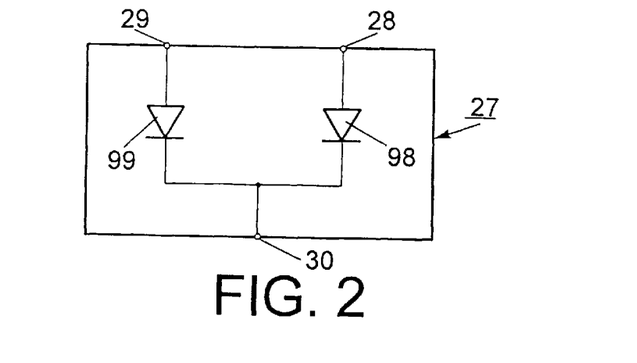
FIG. 2 shows the data transfer means, here formed by means of two diodes, of a data carrier and a circuit for this data carrier in accordance with a second embodiment of the invention.

FIG. 2 only shows the data transfer means 27 of a data carrier and the circuit of this data carrier in accordance with a second embodiment of the invention. As is apparent from FIG. 2, the data transfer means 27 comprise a first diode 98 and a second diode 99. The first diode 98 is arranged between the first data input means 28 and the data output means 30, the first diode 98 having its anode electrically connected to the first data input means 28 and its cathode to the data output means 30. The second diode 99 is arranged between the second data input means 29 and the data output means 30, the second diode 99 having its anode electrically connected to the second data input means 29 and its cathode to the data output means 30.

It is to be noted that in the data carrier in accordance with the second embodiment of the invention and in the circuit in accordance with the second embodiment of the invention after the cathodes of the two diodes 98 and 99 steps should be taken to allow discharging of parasitic capacitances present in circuit sections—which follow the cathodes of the two diodes 98 and 99 and which are consequently formed by input circuit sections of the following data processing means 22—and which can be charged via the two diodes 98 and 99. To discharge these parasitic capacitances a separate grounded resistor, also referred to as a pull-down resistor, may be provided across the data output means 30 of the data transfer means 27, which resistor can have a resistance value in a range of, for example, 10 kΩ and 100 kΩ.

Figure 3:
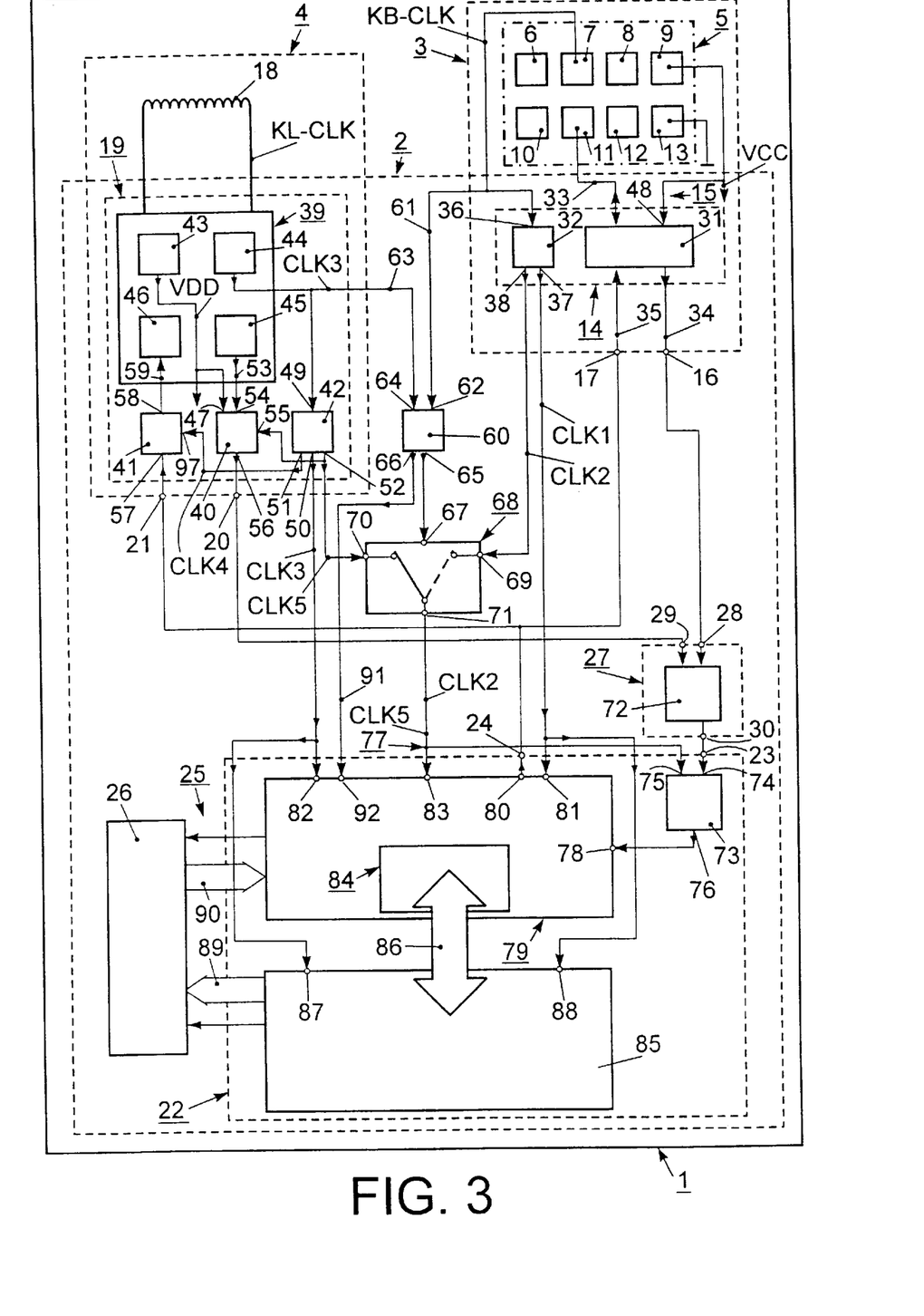
FIG. 3 shows data carrier and a circuit for this data carrier in accordance with third embodiment of the invention in a diagrammatic representation but in more detail than in FIG. 1, the data transfer means now being realized by means of an OR gate.

FIG. 3 shows a further data carrier 1 and the circuit 2 of this data carrier 1 in accordance with a third embodiment of the invention. As regards the data carrier 1 of FIG. 3 the following is to be mentioned in addition to the explanations with reference to the data carrier 1 of FIG. 1.

As can be seen in FIG. 3, the contact 9 of the contact array 5 serves for applying a supply potential VCC to the data carrier 1. The contact 13 serves for applying ground potential. The contact 7 serves for applying a contact-bound clock signal KB-CLK, which in the present example has a frequency of approximately 5.0 MHz. The contact 11 of the contact array 5 forms a data input/output port (I/O) via which data can be transferred in serial form.

The contact-bound signal section 14 in the data carrier 1 of FIG. 3 includes a signal conditioning circuit 31 and a first clock signal processing circuit 32.

The signal conditioning circuit 31 has one side connected to the contact 11 of the contact array 5 via a two-way line 33 and has its other side connected to the contact-bound data output means 16 via a one-way line 34 and to the contact-bound data input means 17 via a further one-way line 35. By means of the signal conditioning circuit 31 both the data signals received via the contact 11 of the contact array 5 and the data signals applied to it via the two-way line 33 can be processed in order to apply the processed data signals to the contact-bound data output means 16, and the data signals applied to the contact-bound data input means 17 can be conditioned in order to be applied to the contact 11 of the contact array 5 via the two-way line 33.

The first clock signal processing circuit 32 serves for processing the contact-bound clock signal KB-CLK, which is applied to an input 36 of the first clock signal processing circuit 32. By means of the clock signal processing circuit 32 the contact-bound clock signal KB-CLK applied to it is regenerated and is supplied as the regenerated first clock signal CLK1 to a first output 37 of the first clock signal processing circuit 32. The first clock signal CLK1 also has a frequency of 5.0 MHz. The first clock signal processing circuit 32 further derives a second clock signal CLK2 from the contact-bound clock signal KB-CLK applied to it, which second clock signal has a frequency of 9.6 kHz and is supplied to a second output 38 of the first clock signal processing circuit 32.

For the data carrier 1 of FIG. 3 it is to be noted that the contactless signal section 19 includes an analog signal section 39 and a decoding stage 40, an encoding stage 41 and two clock signal processing circuits 42.

In a manner known per se the analog signal section 39 includes a supply potential generating stage 43, a clock signal regenerating stage 44, a demodulator stage 45 and a modulator stage 46. Said four stages 43, 44, 45 and 46 are each connected to the transmission coil 18 in a manner not shown.

By means of the supply potential generating stage 43 a supply potential VDD can be derived from the signal received with the transmission coil 18. By means of the supply potential VDD all the circuit sections of the circuit 2 of the data carrier 1 required in the contactless mode can be energized, for example as shown for the decoding stage 40, to which the supply potential VDD can be applied via a supply potential input 47.

It is to be noted here that the supply potential VCC which can be applied to the data carrier 1 via the contact 9 of the contact array 5 serves for energizing all the circuit sections of the data carrier 1 required in the contact-bound mode. Consequently, the supply potential VCC can be applied to all the circuit sections necessary for carrying out contact-bound mode, as is shown by way of example for the signal conditioning circuit 31, to which the supply potential VCC can be applied via a supply potential input 48.

By means of the clock signal regenerating stage 44 the contactless clock signal KL-CLK contained in the signal received with the transmission coil 18 can be derived from the last-mentioned signal, which clock signal has a frequency of 13.56 MHz in the present example. In this case the clock signal regenerating stage 44 derives a third clock signal CLK3 from the received contactless clock signal KL-CLK, which third clock signal can be applied to an input 49 of the clock signal processing circuit 42. The second clock signal processing circuit 42 transfers the third clock signal CLK3 to a first output 50 basically without any change and with a frequency of 3.39 MHz. The second clock signal processing circuit 42 derives two further clock signals from the third clock signal CLK3 applied to it, namely a fourth clock signal CLK4 having a frequency of 800 kHz and a fifth clock signal CLK5 having a frequency of 106 kHz. The second clock signal processing circuit 42 supplies the fourth clock signal CLK4 to a second output 51 and supplies the fifth clock signal CLK5 to a third output 52.

The demodulator stage 45 of the analog signal section 39 serves for demodulating a data signal received by means of the transmission coil 18. A demodulated data signal supplied by the demodulator stage 45 can be applied to an input 54 of the decoding stage 40 via a one-way line 53. Moreover, the fifth clock signal CLK5 can be applied to a further input 55 of the decoding stage 40. By means of a suitable decoding process the decoding stage 40 can decode a data signal—which contains the data in a given line code, for example a Miller code—into a simple data format, i.e. a sequence of bits representing either a logic ZERO or a logic ONE. The decoded data can be applied to the contactless data output means 20 via an output 56 of the decoding stage 40. With respect to the decoding stage 40 it is to be noted that this stage supplies data only when it detects that meaningful encoded data are applied to its input 54.

The contactless signal section 19 includes, in analogy to the decoding stage 40, the encoding stage 41 which has an input 57 connected to the contactless data input means 21, via which input the data can be applied to the encoding stage 41. Furthermore, the fourth clock signal CLK4 can be applied to the encoding stage 41 via a further input 97. Data to be output can be encoded by means of the encoding stage 41. The encoded data are transferred from the encoding stage 41 to an output 58 and applied to the modulator stage 46 of the analog signal section 39 via a one-way line 59. Subsequently, the modulator stage 46 effects a modulation process which allows a transfer to a transmitting/receiving device. The modulation process can be, for example, a so-called load modulation.

The data carrier 1 of FIG. 3 and its circuit 2 includes clock signal detection means 60 by means of which the presence of contact-bound clock signal KB-CLK, which occurs in the contact-bound mode, and the presence of a contactless clock signal KL-CLK, which occurs in the contactless mode. For this purpose, the contact-bound clock signal KB-CLK is applied from the contact 7 of the contact array 5 to a first input 62 of the clock signal detection means 60 via a line 61. Moreover, the third clock signal CLK3 corresponding to the contactless clock signal KL-CLK is applied to a second input 64 of the clock signal detection means 60 via a further line 63.

The clock signal detection means 60 make it possible to detect whether the clock signal KB-CLK or CLK3 appears on the respective input 62 or 64 and also to detect whether both clock signals KB-CLK and CLK3 appear on the two inputs 62 and 64 at the same time, i.e. that both the contact-bound mode and the contactless mode have been activated because both clock signals KB-CLK and CLK3 appear on the two inputs 62 and 64 of the clock signal detection means 60 only in the last-mentioned situation. Thus, the clock signal detection means 60 constitute additional detection means by which it is possible to detect that both the contact-bound mode and the contactless mode have been activated.

When the clock signal detection means 60 detect the presence of the contact-bound clock signal KB-CLK on their output 62, the clock signal detection means 60 produce contact-bound control information KBSI on a first output 65. When the clock signal detection means 60 detect the presence of a third clock signal CLK3 on their second input 64 the clock signal detection means produce contactless control information KLSI on their first output 65. When the clock signal detection means 60 detect the simultaneous presence of both clock signals KB-CLK and KB-CLK3 on their two inputs 62 and 64, the clock signal detection means 60 also produce the contact-bound control information KBSI on their output 65, which means that in this case the contact-bound mode has a so-called master function, and the clock signal detection means 60 produce inhibit information BI on a second output 66.

A control input 67 of a clock signal switching device 68 is connected to the first output 65 of the clock signal detection means 60. The clock signal switching device 68 has a first clock signal input 69, a second clock signal input 70 and a clock signal output 71. The first clock signal input 69 is connected to the output 38 of the first clock signal processing circuit 32, as a result of which the second clock signal CLK2 having a frequency of 9.6 kHz can be applied to the first clock signal input 69, which frequency corresponds to the data transfer rate in the contact-bound mode. The second clock signal input 70 is connected to the third output 52 of the second clock signal processing circuit 42, as a result of which the fifth clock signal CLK5 can be applied to the second clock signal input 70, which fifth clock signal has a frequency of 106 kHz, which corresponds to the data transfer rate in the contactless mode.

When the contact-bound control information KBSI is applied to the clock signal switching device 68 the clock signal switching device 68 provides a connection from the first clock signal input 69 to the clock signal output 71. When contactless control information KLSI is applied to the clock signal switching device 68 the clock signal switching device 68 provides a connection from the second clock signal input 70 to the clock signal output 71. Thus, the clock signal required in the instantaneously active mode is always available on the clock signal output 71.

With respect to the signal conditioning circuit 31 in the contact-bound signal section 14 of the contact-bound interface means 3 it is to be noted further that the signal conditioning circuit 31 assures that in the case that no supply potential VCC appears on its supply potential input 48, a potential corresponding to a logic ZERO is applied to the one-way line 34, as a result of which the contact-bound data output means 16 of the contact-bound interface means 3 are set to a state which corresponds to a logic ZERO. Thus, the signal conditioning circuit 31 constitutes means which in the absence of the supply potential VCC, i.e. when the contact-bound mode is inactive, assures that the contact-bound data output means 16 of the contact-bound interface means 3 are set to a state which corresponds to a logic ZERO.

Furthermore, as regards the decoding stage 40 in the contactless signal section 19 it is to be noted that, in the case that no supply potential VDD is applied to its supply potential input 47, the decoding stage 40 produces on the output 56 of the decoding stage 40 a potential which corresponds to a logic ZERO, as a result of which the contactless data output means 20 of the contactless interface means 4, which output means are connected to the output 56.

are also set to a state which corresponds to a logic ZERO. Thus, the decoding stage 40 constitutes further means which in the absence of the supply potential VDD, i.e. when the contactless mode is inactive, assures that the contactless data output means 20 of the contactless interface means 4 are also set to a state which corresponds to a logic ZERO.

The data carrier 1 and the circuit 2 of the data carrier 1 of FIG. 3 also include data transfer means 27. The data transfer means 27 are constituted by an OR gate 72 in a particularly simple and advantageous manner. The data input means 28 and the data input means 29 of the data transfer means 27 then correspond to the two inputs of the OR gate 72 and the data output means 30 of the data transfer means 27 correspond to the output of the OR gate 72. The specific advantage of such an OR gate 72 used as data transfer means 27 is that substantially no voltage loss occurs between its inputs and its output, as a result of which always the full voltage swing is available on the output. When the contact-bound mode is inactive the first data input means 28 of the data transfer means 27 are at a potential which corresponds to a logic ZERO. When the contactless mode is inactive the second data input means 29 of the data transfer means 27 are at a potential which corresponds to a logic ZERO.

Since it is constructed to perform a logic OR function, the OR gate 72 can transfer data received on the first data input means 28 and data received on the second data input means 29 to the data output means 30, in such a manner that in the case of a separate occurrence of the afore-mentioned data said data are transferred separately and in the case of a simultaneous occurrence of said data they are transferred simultaneously to the data output means 30 and hence to the data processing means 22.

In the present case, the data processing means 22 include a so-called synchronization flip-flop 73 having a data input 74, a clock signal input 75 and a data output 76. The data input 74 is connected to the data input means 23 of the data processing means 22. The clock signal input 75 is connected to the clock signal output 71 of the clock signal switching device 68 via a clock signal line 77, as a result of which the synchronization flip-flop 73 can always receive the clock signal CLK2 or CLK5 required in the active mode via the clock signal input 75. The synchronization flip-flop 73 serves for synchronizing the data applied to the data input 74 with the respective clock signal CLK2 or CLK5. From the output 76 of the synchronization flip-flop 73 the synchronized data are applied to an input 78 of data conditioning means 79, which is effected in serial form. The data conditioning means 79 basically comprise a universal synchronous transmitting/receiving unit, which inter alia enable a conversion of data between serial form and parallel form and which includes error detection means which enable data transmission errors to be detected and which further includes means which enable data to be embedded in a desired data protocol. In the present case the data conditioning means 79 are realized in hardware form. However, they can alternatively be realized in software form.

In addition to the data input 78 the data conditioning means 79 have a data output 80 connected to the data output means 24 of the data processing means 22. Furthermore, the data conditioning means 79 have a first clock signal input 81, via which the first clock signal CLK1 can be applied, a second clock signal input 82, via which depending on the activated mode the third clock signal CLK3 can be applied, and a third clock signal input 83, via which depending on the activated mode either the second clock signal CLK2 or the fifth clock signal CLK5 can be applied from the clock signal output 71 of the clock signal switching device 68 via the clock signal line 77.

The data conditioning means 79 include register means 84 comprising a plurality of registers.

The data processing means 22 further include a microprocessor 85. The microprocessor 85 is connected to the register means 84 via a bus line 86, enabling the register means to be read out and read in by the microprocessor 85.

The microprocessor 85 further has a first clock signal input 87 and a second clock signal input 88. The first clock signal CLK1 can be applied to the microprocessor 85 via the first clock signal input 87. The third clock signal CLK3 can be applied to the microprocessor 85 via the second clock signal input 88.

The microprocessor 85 is connected to the memory means 26 via a bus line 89 which forms part of the bus 25. Via the bus line 89 data can be loaded into the memory means 26 with the aid of the microprocessor 85, i.e. data received by the data carrier 1 either in the contact-bound mode or in the contactless mode.

The memory means 26 are connected to the data conditioning means 79 via a further bus line 90 which also forms part of the bus 25. By means of this further bus line 90 data can be read from the memory means 26 with the aid of the data conditioning means 79 under control of the microprocessor 85, which data after they have been read out are output by the data carrier 1 either in the contact-bound mode or in the contactless mode.

When in the contact-bound mode the data carrier 1 receives data via the contact 11 of the contact array 5 the data thus received are applied to the first data input means 28 of the data transfer means 27 via the two-way line 33, the signal conditioning circuit 31, the one-way line 34 and the contact-bound data output means 16. The data transfer means 27 transfer the applied data to their data output means 30 and hence to the data processing means 22, which ensure that the received data are stored in the memory means 26 with the aid of the synchronization flip-flop 73, the data conditioning means 79, and the microprocessor 85.

Likewise, data received in the contactless mode of the data carrier 1 which are received inductively, i.e. in a contactless manner, by means of the transmission coil 18 and which are decoded by means of the decoding stage 40—are applied from the decoding stage 40 to the second data input means 29 of the data transfer means 27 via the output 56 of said stage. In the present case, the data transfer means 27 also assure a trouble-free transfer of the applied data to the data output means 30 and hence to the data processing means 22, which in a similar manner assure that the received data are loaded into the memory means 26.

When in the data carrier 1 of FIG. 3 both the contact-bound mode and the contactless mode are activated and the received data are applied both to the first data input means 28 and the second data input means 29 of the data transfer means 27, the data transfer means 27 transfer the simultaneously received data at the same time to the data output means 30, as a result of which the simultaneously transferred data, which basically form a meaningless and unusable data mixture, are routed to the data processing means 22 and, consequently, to the data conditioning means 79. In this case, the clock signal detection means 60 detect that a clock signal KB-CLK and a clock signal CLK3 appears at the same time on its inputs 62 and 64, respectively, as a result of which the clock signal detection means produce inhibit information BI on their second output 66. This inhibit information BI is applied to a control input 92 of the data conditioning means 79 via a line 91. In the data conditioning means 79 the inhibit information BI inhibits processing of data, i.e. in this case the meaningless and unusable data mixture, applied to the data processing means 22 and thus to the data conditioning means 79 via the data input means 23.

This means that when it is detected that both the contact-bound mode and the contactless mode have been activated the clock signal detection means 60 can cause the processing of data applied by the data processing means 22 via their data input means 23 to be inhibited.

It is to be noted that the data output means 24 of the data processing means 22 and the contact-bound data input means 17 of the contact-bound interface means 3 and the contactless data input means 21 of the contactless interface means 4 are electrically connected to one another. This is particularly advantageous in view of a simple circuit design. However, this advantageous is also obtained with the data carrier 1 shown in FIG. 1.

Both when the contact-bound mode is activated and when the contactless mode is activated data stored in the memory means 26 and to be output by the data carrier 1 can be read from the memory means 26 with the aid of the data conditioning means 79 under control of the microprocessor 85, which data can be applied both to the data input means 17 of the contact-bound interface means 3 and to the data input means 21 of the contactless interface means 4 via the data output 80 of the data conditioning means 79 and the data output means 24 of the data processing means 22. Thus, in the case of data output by the data carrier 1 the output data are applied both by the contact 11 of the contact array 5 and by the transmission coil 18, which does not have any drawback at all.

The invention is not limited to the embodiments described hereinbefore by way of examples. It is to be noted that data transfer means constructed to perform a logic OR function can also be realized by means of a circuits of a substantially more intricate circuit design.

What is claimed is:

1. A data carrier which can be operated in a contact-bound mode and in a contactless mode and which includes the means specified hereinafter, namely contact-bound interface means via which data can be received in the contact-bound mode and which include contact-bound data output means for supplying data received in the contact-bound mode, and contactless interface means via which data can be received in the contactless mode and which include contactless data output means for supplying data received in the contactless mode, and data processing means which include data input means for receiving data received in the contact-bound mode and received in the contactless mode and by which the data received in the contact-bound mode and received in the contactless mode can be processed, and data transfer means which include first data input means and second data input means as well as data output means, of which the first data input means are connected to the contact-bound data output means of the contact-bound interface means, and of which the second data input means are connected to the contactless data output means of the contactless interface means, and of which the data output means are connected to the data input means of the data processing means, and which are constructed to transfer data received in the contact-bound mode and applied to their first data input means, and to transfer data received in the contactless mode and applied to their second data input means to the data processing means via their data output means, and to inhibit a transfer of received data from one of their data input means to the other one of the data input means, characterized in that the data transfer means are constructed to perform a logic OR function, and in conformity with this construction the data transfer means are adapted to simultaneously transfer data received simultaneously on their first data input means and on their second data input means to their data output means and thus to the data processing means.

2. A data carrier as claimed in claim 1, characterized in that the data transfer means are formed by an OR gate.

3. A data carrier as claimed in claim 1, characterized in that the data processing means include data output means for the output of data to be output in the contact-bound mode and in the contactless mode, and the contact-bound interface means include contact-bound data input means for receiving data to be output in the contact-bound mode, and the contactless interface means include contactless data input means for receiving data to be output in the contactless mode, and the data output means of the data processing means and the contact-bound data input means of the contact-bound interface means and the contactless data input means of the contactless interface means are electrically connected to one another.

4. A data carrier as claimed in claim 1, characterized in that there have been provided means which when the contact-bound mode is not active cause the contact-bound data output means of the contact-bound interface means to be set to a state corresponding to a logic ZERO, and there have been provided further means which when the contactless mode is not active cause the contactless data output means of the contactless interface means to be set likewise to a state corresponding to a logic ZERO.

5. A data carrier as claimed in claim 1, characterized in that there have been provided detection means capable of detecting that both the contact-bound mode and the contactless mode have been activated and which upon detection of the fact that both the contact-bound mode and the contactless mode have been activated can cause the processing by the data processing means of data applied to said data processing means via their data input means to be inhibited.

6. A data carrier as claimed in claim 5, characterized in that the detection means are formed by clock signal detection means which enable a detection of the presence of a contact-bound clock signal which appears when the contact-bound mode is activated and the presence of a contactless clock signal which appears when the contactless mode is activated.

7. A circuit for a data carrier, which circuit can be operated in a contact-bound mode and in a contactless mode and which includes the means specified hereinafter, namely contact-bound interface means via which data can be received in the contact-bound mode and which include contact-bound data output means for supplying data received in the contact-bound mode, and contactless interface means via which data can be received in the contactless mode and which include contactless data output means for supplying data received in the contactless mode, and data processing means which include data input means for receiving data received in the contact-bound mode and received in the contactless mode and by which the data received in the contact-bound mode and received in the contactless mode can be processed, and data transfer means which include first data input means and second data input means as well as data output means, of which the first data input means are connected to the contact-bound data output means of the contact-bound interface means, and of which the second data input means are connected to the contactless data output means of the contactless interface means, and of which the data output means are connected to the data input means of the data processing means, and which are constructed to transfer data received in the contact-bound mode and applied to their first data input means, and to transfer data received in the contactless mode and applied to their second data input means to the data processing means via their data output means, and to inhibit a transfer of received data from one of their data input means the other one of the data input means, characterized in that the data transfer means are constructed to perform a logic OR function, and in conformity with this construction the data transfer means are adapted to simultaneously transfer data received simultaneously on their first data input means and on their second data input means to their data output means and thus to the data processing means.

8. A circuit as claimed in claim 7, characterized in that the data transfer means are formed by an OR gate.

9. A circuit as claimed in claim 7, characterized in that the data processing means include data output means for the output of data to be output in the contact-bound mode and in the contactless mode, and the contact-bound interface means include contact-bound data input means for receiving data to be output in the contact-bound mode, and the contactless interface means include contactless data input means for receiving data to be output in the contactless mode, and the data output means of the data processing means and the contact-bound data input means of the contact-bound interface means and the contactless data input means of the contactless interface means are electrically connected to one another.

10. A circuit as claimed in claim 7, characterized in that there have been provided means which when the contact-bound mode is not active cause the contact-bound data output means of the contact-bound interface means to be set to a state corresponding to a logic ZERO, and there have been provided further means which when the contactless mode is not active cause the contactless data output means of the contactless interface means to be set likewise to a state corresponding to a logic ZERO.

11. A circuit as claimed in claim 7, characterized in that there have been provided detection means capable of detecting that both the contact-bound mode and the contactless mode have been activated and which upon detection of the fact that both the contact-bound mode and the contactless mode have been activated can cause the processing by the data processing means of data applied to said data processing means via their data input means to be inhibited.

12. A circuit as claimed in claim 11, characterized in that the detection means are formed by clock signal detection means which enable a detection of the presence of a contact-bound clock signal which appears when the contact-bound mode is activated and the presence of a contactless clock signal which appears when the contactless mode is activated.

* * * * *

UNITED STATES PATENT AND TRADEMARK OFFICE
CERTIFICATE OF CORRECTION

PATENT NO.     : 6,105,874
DATED          : August 22, 2000
INVENTOR(S)    : Dominik J. Berger, Bernhard Czar and Klaus Sickert It is certified that error appears in the above-identified patent and that said Letters Patent is hereby corrected as shown below:

<u>Column 14,</u>
Line 14, after "means" insert -- to --.

Signed and Sealed this

Twelfth Day of November, 2002

Attest:

Attesting Officer

JAMES E. ROGAN
*Director of the United States Patent and Trademark Office*